UNITED STATES PATENT OFFICE.

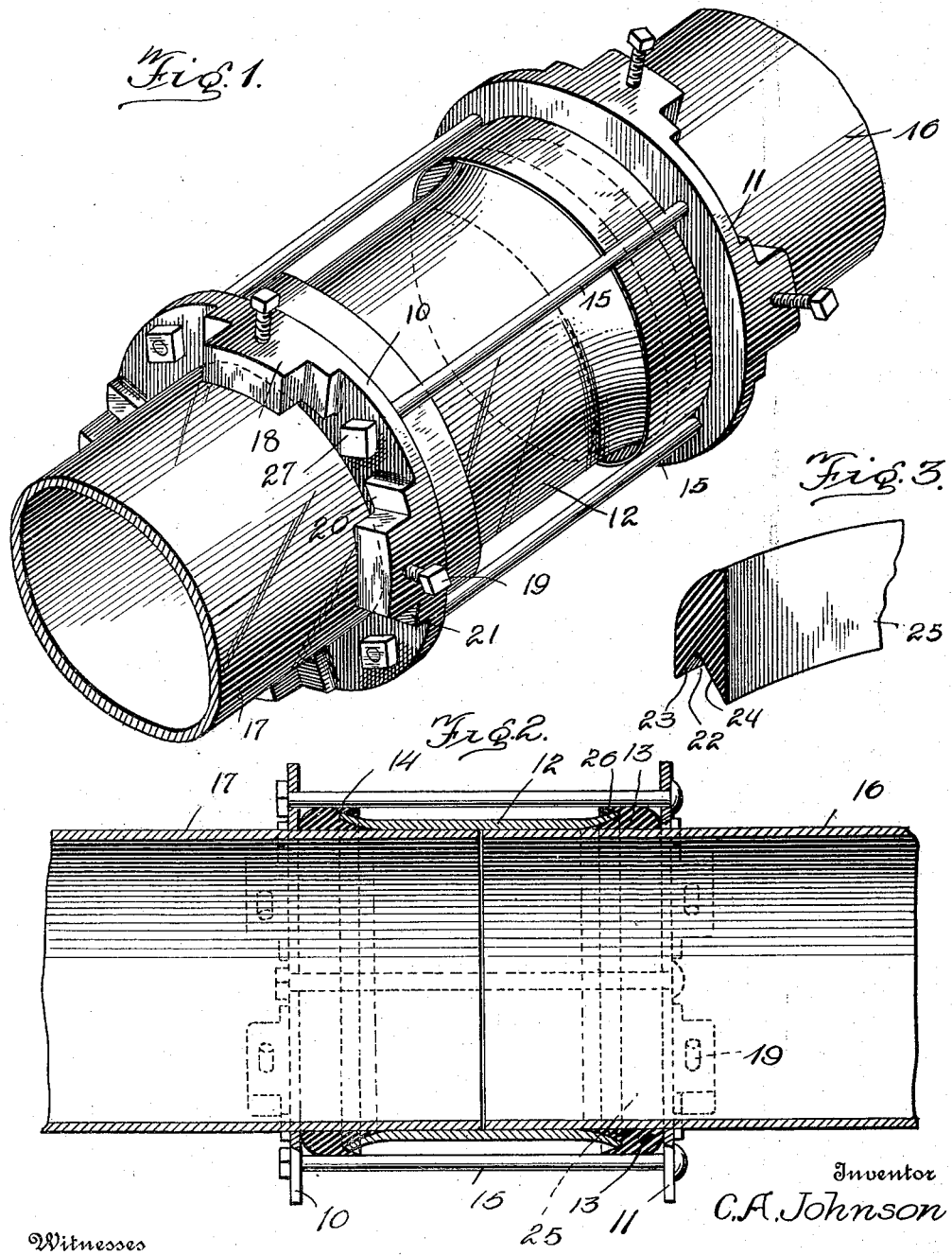

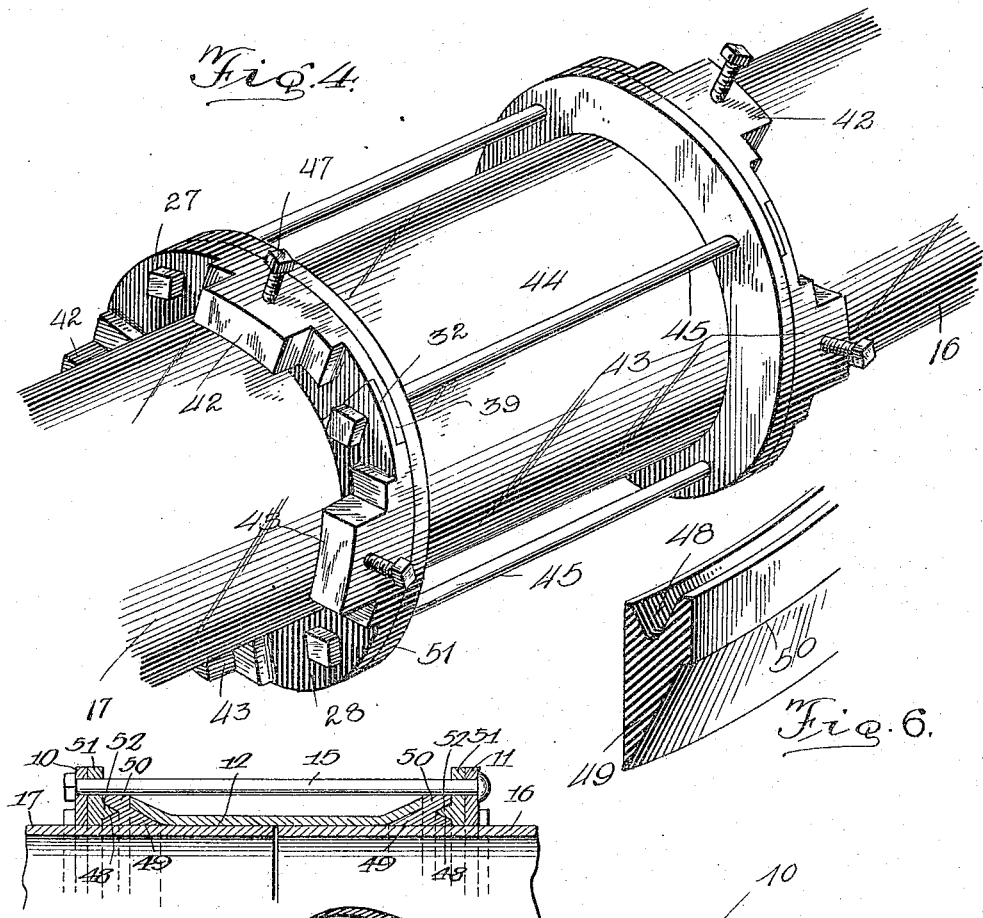

CLEMENT A. JOHNSON, OF CADIZ, OHIO, ASSIGNOR OF ONE-THIRD TO E. T. JONES, OF ST. CLAIRSVILLE, OHIO.

PIPE-COUPLING.

1,196,785.  Specification of Letters Patent.  Patented Sept. 5, 1916.

Application filed December 12, 1913. Serial No. 806,253.

*To all whom it may concern:*

Be it known that I, CLEMENT A. JOHNSON, citizen of the United States, residing at Cadiz, in the county of Harrison and State of Ohio, have invented certain new and useful Improvements in Pipe-Couplings, of which the following is a specification.

The subject-matter of the present invention is directed to new and useful improvements in pipe couplings, and has particular reference to that type of such devices as are employed in connecting the meeting terminals of gas mains or the like.

It is a well known fact that one of the principal difficulties encountered in connecting gas pipes or gas mains is to prevent the buckling of the connected terminals when a high pressure is maintained in the pipes or mains.

As its primary object, therefore, the present invention aims to prevent the pipes or main section from buckling by providing a novel form of coupling in which each member of the coupling is adjustably but securely fixed in its relation to the pipe section to which it is applied, and to equip the coupling sections with connecting devices which hold them in the desired relation to each other, and also serve to maintain a suitable gasket in place.

A further object is to simplify the construction of the coupling to such an extent that it may be cheaply manufactured, and may be readily and quickly applied to the meeting terminals of the pipes whether they are being laid or have already been laid, and are to be equipped with the coupling of this invention.

The above and additional objects are accomplished by such means as are illustrated in the accompanying drawings, described in the following specification, and then more particularly pointed out in the claims which are appended hereto and form a part of this application.

With reference to the drawings, wherein there has been illustrated the preferred embodiment of this invention as it is reduced to practice, and throughout the several views of which similar reference numerals designate corresponding parts, Figure 1 is a perspective view illustrating the preferred form of coupling in assembled position at the meeting terminals of two pipe sections; Fig. 2 is a longitudinal section taken medially through the coupling as shown in Fig. 1; Fig. 3 is a detail perspective view illustrating the preferred form of gasket employed when the form of coupling illustrated in Figs. 1 and 2 is utilized; Fig. 4 is a perspective view illustrating a modification of the coupling showing the coupling rings as formed in two semi-circular sections; Fig. 5 is a perspective view illustrating the two sections of the ring shown in Fig. 4 in disassembled relation; Fig. 6 is a fragmentary perspective view illustrating a modified form of gasket; and Fig. 7 is a section showing the holding ring by which this modified form of gasket is held in proper position. Fig. 8 is a fragmentary sectional view, showing the gasket and holding ring of Fig. 7 in position at the junction of adjacent pipe sections.

As previously set forth, the preferred form of the coupling of this invention is best illustrated in Fig. 1, and reference will now, therefore, be had to this figure particularly. The form of coupling shown in Fig. 1 consists essentially in a pair of locking rings 10 and 11, between which are interposed a coupling collar 12 and a pair of gaskets 13 and 14. Bolts or rods 15 bear against the gaskets 13 and 14 and are employed in holding the locking rings 10 and 11 in the proper connected relation in a manner which will be hereinafter fully disclosed.

The locking rings 10 and 11 which are, as shown in both Figs. 1 and 2, designed for application to the meeting terminals of pipe sections, indicated at 16 and 17, are annular in shape and are preferably constructed of tempered steel, although, if so desired, a cheaper grade of material may be employed. Inasmuch as the two locking rings 10 and 11 are substantially identical in construction, it is deemed necessary to describe only one of them in detail, the member 10 being chosen in this instance.

As previously set forth, each locking ring is intended to be securely clamped in proper position on the pipe section, and the member 10 is, therefore, for this purpose equipped with a number of lugs 18. Each lug 18 is substantially rectangular and is formed with an approximately centrally disposed threaded bore which receives a set-screw, which may be of the type indicated at 19, or any other form of fastening devices which may be efficient. These lug members 18 are in the preferred embodiment of the invention formed integrally with the locking rings, although, obviously if so desired, they may be cast separately and riveted or otherwise secured without departing from the spirit of this invention.

It will be noted that the inner faces of the lugs are arranged in spaced relation to the inner edges of the ring. By this construction, filling blocks or rings may, if desired, be interposed between the said lugs and the pipe sections to be engaged by the set screws 19 for effectively gripping the pipe sections.

In practice, it has been found preferable to employ four of these lug members 18, spacing them quadrantly on the member 10, but it is obvious that the number of lugs employed is a purely arbitrary matter, and one to be governed by the conditions concurrent with the adoption of the coupling. In this connection, it will be apparent that if the coupling is to be applied to a relatively large main, it will be necessary to employ more than four of the lugs, since the pressure exerted at the meeting terminals of the main pipe sections could not be withstood by so small a number of fastening devices. The lugs 18 project laterally from the rings and are, of course, arcuate to conform to the outer face of the pipe sections.

The form of locking ring illustrated in Figs. 1 and 2 is employed when the pipe line is being laid, it being apparent that if the line has already been laid, it would be impossible to apply a solid annular ring. Under such conditions the form of coupling illustrated in Figs. 4 and 5 is employed, as will be described in detail hereinafter.

In applying the coupling, the meeting terminals of the members 16 and 17 are first inserted in the coupling collar 12. After the coupling collar has been properly positioned, the gaskets 13 and 14 are interposed between the terminals of the collar and the members 10 and 11. Referring now to Fig. 3, it will be noted that the preferred form of gasket, which is annular in shape, is formed at one edge with a V-shaped notch, the two walls of the notch being designated by the numerals 23 and 24. In applying the gasket, the wall 24, which is of greater length than the wall 23 and is inclined at a less angle to the inner wall 25 of the gasket, is inserted between the pipe section and the terminal of the collar 12. As indicated at 26, each terminal of the collar 12 is flared, producing an annular lip which projects into the V-shaped notch 22.

From the foregoing, it will be apparent that by inserting the bolts 15 through the apertures which are formed in the rings 10 and 11, and applying the nuts 27, the gaskets 13 and 14 will be urged toward each other to securely wedge the portions, defined by the wall 24 and the wall 25, into engagement with the terminal lips of the collar 12 and the pipes 16 and 17, the bolts or rods 15, by engagement with the gaskets, serving to hold said gaskets in position. After the nuts 27 have been threaded on the bolts 15 until the gaskets have been brought into the desired engagement with the pipes and collar so that an air tight joint has been effected, the set-screws 19 are threaded through the lugs 18 until the terminals of the set-screws bite into the pipe. It will be apparent that when the set-screws have been thus threaded home, the rings 10 and 11 will be held against both rotation and longitudinal movement on the pipe sections, and that all possibility of disconnection between the members 16 and 17, such as might occur from excessive pressure and consequent buckling, will be eliminated.

As previously set forth, it will be impossible to apply the coupling of the preferred form illustrated in Figs. 1 and 2, to a pipe line which has already been laid. There has, therefore, been provided a modified form of coupling which may be readily positioned on the meeting terminals of pipes which have already been assembled. This modified form is illustrated in Figs. 4 and 5, and reference will, therefore, be now had particularly to these figures.

As will be noted upon reference to the drawings, the modified form of locking rings differs from the preferred form only in that they each consist in two semi-circular sections, which are individually designated in Fig. 5 by the numerals 27 and 28. The one section 27 is cut-away from the inner face of its terminals, producing the radial shoulders 29 and 30 and the lugs 31 and 32. These lugs 31 and 32 are apertured as at 34 and 35 and are designed to register with the openings or apertures 36 and 37 of the lugs 38 and 39, respectively. These members 38 and 39 are formed by cutting away the terminals of the section 28 from their outer faces. Radial shoulders 40 and 41 are formed, in connection with the members 38 and 39. On each of the sections 27 and 28 is carried a pair of integrally formed lugs or projections 42 and 43 which correspond to the members 18.

Referring now to Fig. 4, it will be seen that the two sections 27 and 28 of each of the locking rings of the modified form are held in assembled relation to each other by inserting the connecting bolts 44 through the registering apertures 35 and 37 and 34 and 36. It will also be observed that when the two sections are connected, the terminals 31 and 32 will abut the radial shoulders 40 and 41, while the members 38 and 39 abut the radial shoulders 29 and 30. When this modified form of coupling of Fig. 5 is applied to the meeting terminals of pipe sections which are already connected by some other well known form of coupling, it has been found expedient to let the old coupling remain in position, and to dispose the device of Fig. 5 so that the locking rings will engage the opposite ends of the old coupling, as in Fig. 4. When the rings have been applied and properly secured, they, of course, strengthen the joint and prevent the buckling of the pipe sections when a heavy pressure is maintained in the pipe line.

It has been found desirable in some instances to employ a modified form of gasket such as is illustrated in Figs. 6 and 7. This modified form of gasket is, of course, annular in shape, being formed of rubber or any other suitable material. This modified form of gasket is equipped at its outer edge with a V-shaped notch, as indicated at 48, while its forward edge is formed in the nature of an annular wedge, as indicated at 49. An annular shoulder 50 defines the base portion of the wedge and is adapted to limit the inward movement of the wedge portion 49 into the collar 45 by engagement with the terminal of the collar. When this modified form of gasket is used, a holding ring 51 is employed. This ring is interposed between the gasket and the locking ring, and is equipped with a cross sectionally V-shaped annular rib 52 which is insertible in the V-shaped groove 48 and obviously acts to hold the gasket in the proper position. Relative to the action of the rib 52 it will be noted that it will firmly bind the rear portion of the gasket against the pipe section, since the inclined lower face of the rib will slide along the corresponding inclined inner face of the notch 48.

It will be, of course, understood that it is entirely within the scope of this invention to eliminate the holding ring 51 and form the annular rib 52 directly on the locking rings of either the preferred or modified forms. In this connection, it may be explained that if the modified form of gasket is found to be more efficient than the preferred form, as it doubtlessly will in some instances, the ribs 52 may be made integrally with the locking rings to save expense in manufacture. It will be obvious, however, that when the modified form of gasket is to be used only occasionally, it will be necessary to supply the separate holding ring 51 as above set forth.

In reduction to practice, it has been found that the form of this invention illustrated in the drawings, and referred to in the above description as the preferred embodiment, is the most efficient and practical; yet realizing that the conditions concurrent with the adoption of this device will necessarily vary, it is desired to emphasize the fact that various minor changes in details of construction, proportion and arrangement of parts may be resorted to, when required, without sacrificing any of the advantages of this invention, as defined in the appended claims.

What is claimed is:—

1. In a pipe coupling, a solid imperforate coupling collar having its inner wall smooth and unobstructed and its opposite ends bent laterally to form outwardly projecting terminal lips, gaskets adapted for disposal one at each end of the collar and each provided with an annular wedge for engagement between the terminal lip of the collar and the exterior surface of one of the pipes to be coupled, holding rings having their outer faces provided with smooth bearing surfaces and their inner faces formed with V-shaped ribs, each of the gaskets being provided with an annular V-shaped recess adapted to receive the rib on the adjacent holding ring, locking rings adapted for disposal against the smooth bearing surfaces of the holding rings, and means piercing the locking rings and holding rings for adjustably connecting the parts.

2. In a pipe coupling, a solid coupling collar having its outer wall smooth and unobstructed and its inner wall bent laterally to form outwardly projecting terminal lips entirely surrounding the collar, gaskets adapted for disposal one at each end of the collar and each having one end thereof provided with an annular wedge for engagement between the adjacent terminal lip of the collar and the exterior surface of one of the pipes to be coupled and at its other end formed with an annular V-shaped recess, holding rings adapted for disposal one against each of the gaskets, each of the rings being provided near its inner periphery with an annular V-shaped rib fitted in the V-shaped recess of the respective gasket, each of the said holding rings having its outer periphery located outwardly beyond the outer wall of the respective gasket, locking rings adapted for disposal one against each of the holding rings, each of the locking rings comprising arcuate sections adapted to be assembled with their ends overlapped, and clamping bolts fitting through the overlapped ends of the locking rings and through the holding rings and adjustable to draw the several parts together.

3. In a pipe coupling, a solid imperforate coupling collar having its inner wall smooth and unobstructed and its opposite ends flared laterally to form outwardly projecting annular lips, gaskets having projections insertible between the annular lips and the outer surfaces of the pipes to be coupled, locking rings mounted upon the pipes at said gaskets and having their inner opposed side faces smooth and unobstructed and their outer side faces cut away at predetermined points to form intermediate laterally extending lugs, clamping bolts piercing the locking rings at the cut-away portions thereof and bearing against the gaskets for drawing said locking rings together and compressing the gaskets, and clamping screws threaded in openings in the lugs on the locking ring and having their inner ends bearing against the adjacent pipe and their outer ends projected beyond the outer periphery of the locking rings and provided with means for engagement with an operating tool.

In testimony whereof I affix my signature in presence of two witnesses.

CLEMENT A. JOHNSON. [L. S.]

Witnesses:
    FINLEY B. NASH,
    KINSEY E. TOOLE.